US009001617B2

(12) United States Patent
Storteig et al.

(10) Patent No.: US 9,001,617 B2

(45) Date of Patent: Apr. 7, 2015

(54) MARINE SEISMIC STREAMER WITH INCREASED SKIN STIFFNESS

(75) Inventors: Eskild Storteig, Rognan (NO); Oeystein Traetten, Asker (NO)

(73) Assignee: Westerngeco L.L.C., Houston, TX (US)

( * ) Notice: Subject to any disclaimer, the term of this patent is extended or adjusted under 35 U.S.C. 154(b) by 242 days.

(21) Appl. No.: 12/545,232

(22) Filed: Aug. 21, 2009

(65) Prior Publication Data

US 2011/0044128 A1 Feb. 24, 2011

(51) Int. Cl.
*G01V 1/38* (2006.01)
*G01V 1/20* (2006.01)

(52) U.S. Cl.
CPC .................................... *G01V 1/208* (2013.01)

(58) Field of Classification Search
CPC .... G01V 1/201; G01V 1/208; B29C 47/0004; B29C 47/0023; B29C 47/02; B29C 47/027; F16L 11/0081
USPC ......................... 138/121, 172, 109, 118, 119; 174/101.5; 405/157; 367/20, 21, 24, 367/153, 178, 154; 114/253
See application file for complete search history.

(56) References Cited

U.S. PATENT DOCUMENTS 3,290,645 A 12/1966 Pavey, Jr. et al.
3,781,778 A 12/1973 Sawin et al.
4,300,218 A 11/1981 Kruka et al.
4,402,069 A * 8/1983 Miller et al. .................. 367/154
4,410,012 A * 10/1983 Redding et al. ............... 138/121
4,638,469 A 1/1987 Bryant et al.
4,809,243 A 2/1989 Bledsoe et al.
5,272,679 A * 12/1993 Carpenter ....................... 367/20
5,274,603 A 12/1993 Zibilich, Jr. et al.
5,682,925 A * 11/1997 Seckel .......................... 138/118
5,777,954 A 7/1998 Hepp
5,943,293 A 8/1999 Luscombe et al.
6,185,154 B1 * 2/2001 Miller .......................... 367/130
6,477,111 B1 11/2002 Lunde et al.
7,298,672 B1 11/2007 Tenghamn et al.
7,382,689 B2 6/2008 Maples et al.
7,460,434 B2 12/2008 Stenzel et al.
7,468,932 B2 12/2008 Tenghamn
7,518,948 B2 4/2009 Stenzel et al.
7,548,486 B2 6/2009 Tenghamn
7,573,781 B2 8/2009 Fernihough et al.
7,623,414 B2 11/2009 Boergen et al.
7,693,005 B2 * 4/2010 Stenzel et al. .................. 367/20
7,872,942 B2 * 1/2011 Sollner ........................... 367/24
2004/0017731 A1 1/2004 Halvorsen et al.

(Continued)

FOREIGN PATENT DOCUMENTS

GB 2439816 1/2008
WO 2011022673 2/2011

OTHER PUBLICATIONS

Definition of "intermittent," Dictionary.com, downloaded Mar. 23, 2014 from http://dictionary.reference.com/browse/intermittent, pp. 1-3.*

(Continued)

*Primary Examiner* — Isam Alsomiri
*Assistant Examiner* — Daniel L Murphy

(57) ABSTRACT

An apparatus includes a streamer having one or more seismic data acquisition devices enclosed within a skin. The skin has a modulus of elasticity of at least 30 MPa to attenuate a flow noise.

17 Claims, 3 Drawing Sheets

(56) References Cited

U.S. PATENT DOCUMENTS

| | | | |
|---|---|---|---|
| 2006/0239117 | A1 | 10/2006 | Singh et al. |
| 2007/0195648 | A1* | 8/2007 | Borgen et al. ................ 367/178 |
| 2007/0258321 | A1 | 11/2007 | Tenghamn |
| 2007/0258331 | A1 | 11/2007 | Bevan et al. |
| 2007/0258831 | A1 | 11/2007 | Irick |
| 2007/0297286 | A1 | 12/2007 | Stenzel et al. |
| 2008/0008034 | A1 | 1/2008 | Tenghamn et al. |
| 2008/0074946 | A1 | 3/2008 | Hillesund et al. |
| 2008/0117717 | A1 | 5/2008 | Borgen et al. |
| 2008/0175098 | A1 | 7/2008 | Tenghamn |
| 2008/0186803 | A1 | 8/2008 | McKey et al. |
| 2009/0010101 | A1 | 1/2009 | Lunde et al. |
| 2010/0039889 | A1 | 2/2010 | Teigen et al. |
| 2010/0039890 | A1 | 2/2010 | Tustin et al. |
| 2010/0165792 | A1 | 7/2010 | Stenzel et al. |
| 2011/0044129 | A1 | 2/2011 | Traetten et al. |
| 2011/0044130 | A1 | 2/2011 | Traetten et al. |
| 2011/0240329 | A1 | 10/2011 | Ruffa |
| 2011/0273957 | A1 | 11/2011 | Guizelin et al. |

OTHER PUBLICATIONS

“Thermoplastic polyurethane,” Wikipedia, 2014, downloaded Sep. 22, 2014 from http://en.wikipedia.org/wiki/Thermoplastic__polyurethane, pp. 1-3.*

“Thermoplastic elastomer,” Wikipedia, 2008, downloaded from http://en.wikipedia.org/w/index.php?title=Thermoplastic__elastomer&oldid=188602510 on Sep. 23, 2014, pp. 1-2.*

PCT Search Report, dated Feb. 28, 2011, Application No. PCT/US2010/046197.

International Search Report and Written Opinion of PCT Application No. PCT/US2010/046191 dated Feb. 28, 2011: pp. 1-8.

International Search Report and Written Opinion of PCT Application No. PCT/US2010/046200 dated Feb. 28, 2011: pp. 1-8.

“OCS EIS/EA MMS 2006-038: Final Programmatic Environmental Assessment—Arctic Ocean Outer Continental Shelf Seismic Surveys—2006,” Minerals Management Service Alaska OCS Region, 2006: pp. PEA-1-PEA-294.

* cited by examiner 102
30
104
110
112
108
104
106
104
110

102
104
30
110
112
104
106
108
104
110

MARINE SEISMIC STREAMER WITH INCREASED SKIN STIFFNESS

BACKGROUND

This disclosure generally relates to towed streamers for use in acquiring seismic data, and more specifically, to adjusting the skin stiffness of the towed streamers.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In one embodiment, a seismic streamer includes an outer skin for encapsulating various seismic data acquisition devices, including one or more seismic sensors. The streamer skin according to the present disclosure has a modulus of elasticity of at least 30 MPa. In some embodiments, the skin may be formed to include exterior and/or interior ribs. Related methods are described.

Advantages and other features of the present disclosure will become apparent from the following drawing, description and claims.

DETAILED DESCRIPTION

Figure 1:
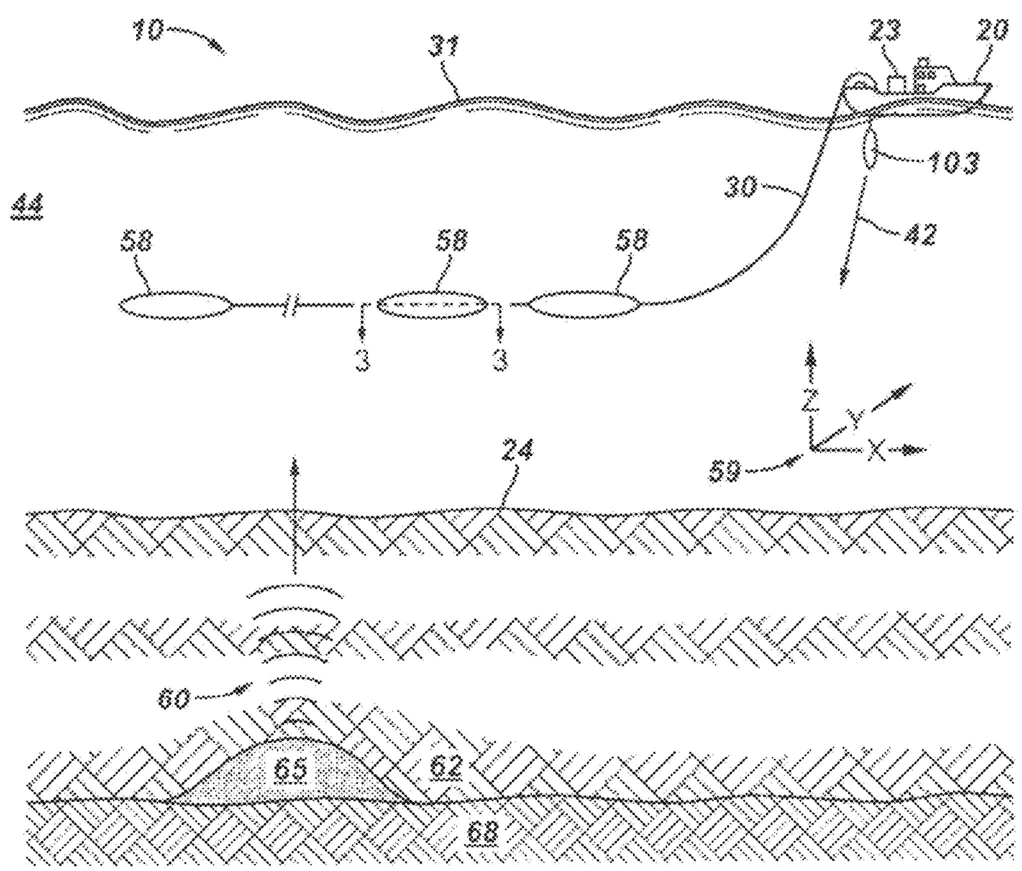
FIG. 1 is a schematic diagram of a marine seismic data acquisition system according to an embodiment of the disclosure.

FIG. 1 depicts an embodiment 10 of a marine seismic data acquisition system in accordance with some embodiments of the disclosure. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the disclosure, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the disclosure, the multi-component seismic sensor may include one or more hydrophones, geophones, particle displacement sensors, particle velocity sensors, accelerometers, pressure gradient sensors, or combinations thereof.

For example, in accordance with some embodiments of the disclosure, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 103 that may be formed from one or more seismic source elements, such as air guns, for example, which are connected to the survey vessel 20. Alternatively, in other embodiments of the disclosure, the seismic source 103 may operate independently of the survey vessel 20, in that the seismic source 103 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 103 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are emitted by the sources 104 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the disclosure. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the disclosure, portions of the analysis of the representation may be performed on the seismic survey vessel 20, such as by the signal processing unit 23.

The main mechanical parts of a conventional streamer typically include skin (the outer covering); one or more stress members; seismic sensors; spacers to support the skin and protect the seismic sensors; and a filler material. In general, the filler material typically has a density to make the overall streamer neutrally buoyant; and the filler material typically has properties that make the material acoustically transparent and electrically non conductive. Certain fluids (kerosene, for example) possess these properties and thus, may be used as streamer filler materials. However, a fluid's ability to dampen vibration waves that propagate along with the streamer is limited.

When gel is used as the filler material, the noise picture changes, as gel is more sensitive to flow noise than fluid. More specifically, the main mechanical difference between fluid and gel as a filler material is the shear stiffness. A fluid has zero shear stiffness, and shear stresses from viscous effects typically are negligible. The shear stiffness is what makes a gel possess solid-like properties. It has been discovered through modeling that the shear stiffness in gel degrades the averaging of flow noise. The degradation in the flow noise cancellation may be attributable to relatively little amount of gel being effectively available to communicate the pressure between each side of the spacer.

Figure 2:
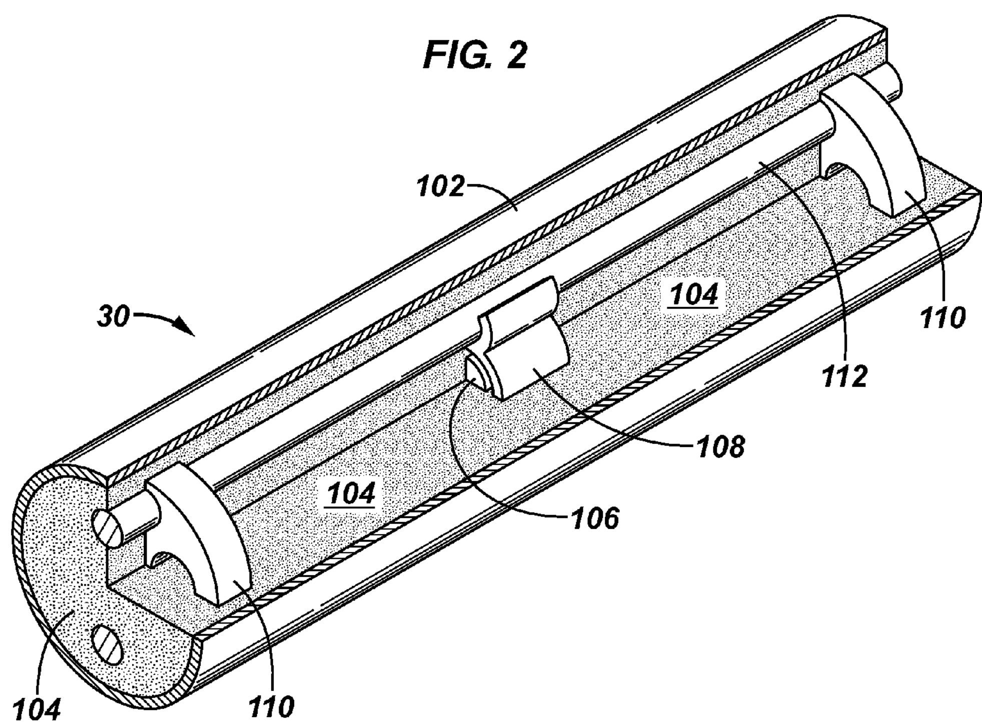
FIG. 2 is a partial broken-away, perspective view of a portion of a streamer according to an embodiment of the disclosure.
Figure 3:
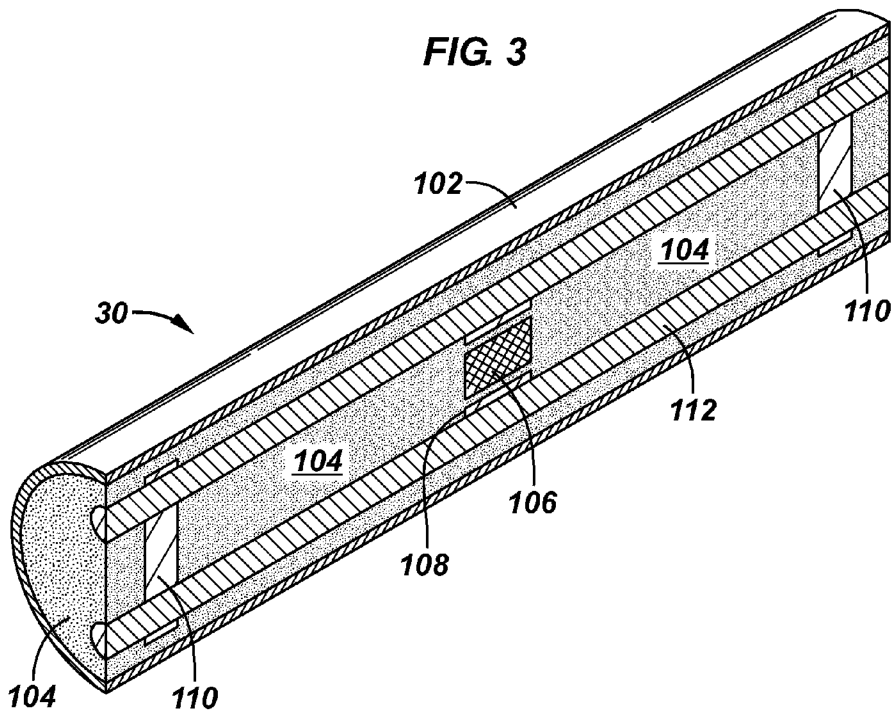
FIG. 3 is a cross-sectional view of a portion of the streamer of FIG. 1 taken along the line 3-3.

Referring to FIG. 2, more specifically, in accordance with embodiments of the disclosure, an exemplary streamer 30 includes an outer skin 102 that defines an interior space that contains a gel 104, a filler material; seismic sensor elements 106 (one seismic sensor element 106 being depicted in FIG. 2) disposed in seismic sensor holder elements 108 (one seismic sensor holder element 108 being depicted in FIG. 2); spacers, such as exemplary spacers 110, which are located on either side of each sensor element 106; and strength members 112 that provide longitudinal support and attachment points for the spacers 110 and holder elements 108.

Turbulent noise is generally caused by turbulent flow external to the streamer skin as the streamer flows through the water column. In the past, liquid-filled streamers have had a relatively soft skin (e.g., as measured via modulus of elasticity) to permit proper handling, e.g., moving, reeling and storing the streamer. Although turbulent noise within liquid-filled streamers has been a concern, it has been found that such noise can be mitigated without adjusting the stiffness of the skin.

Turbulent noise, however, becomes more problematic when operating with gel-filled streamers. That is, gel-filled streamers tend to concentrate the leaked turbulent flow locally around the sensor, thus compromising the data acquired by the sensor. In accordance with the principles of the present disclosure, turbulent noise within a gel-filled streamer 30 can be reduced by increasing the stiffness of the skin 130. Streamer skin used with conventional liquid-filled streamers is typically manufactured to have a modulus of elasticity in the range of 20-25 MPa. According to one embodiment of the present disclosure, the skin 130 is formed of a thermal plastic polyurethane elastomer having a modulus of elasticity of at least 30 MPa. When towing a streamer through water, the friction between the streamer and the water causes turbulent flow, which imparts pressure on the streamer skin. The pressure acting on the streamer can thus generate flow noise within the streamer by leaking through the streamer skin. However, increasing the skin stiffness according to the present disclosure reduces the amount of pressure that leaks through the skin, and thus reduces the turbulent flow noise within the streamer. In some embodiments, the streamer skin may have a modulus of elasticity in the range of 30 MPa to 150 MPa, or more particularly 45-65 MPa, or even more particularly approximately 55 MPa. In some embodiments, the modulus of elasticity of the skin varies from an exterior surface of the skin to an interior surface of the skin.

Figure 4:
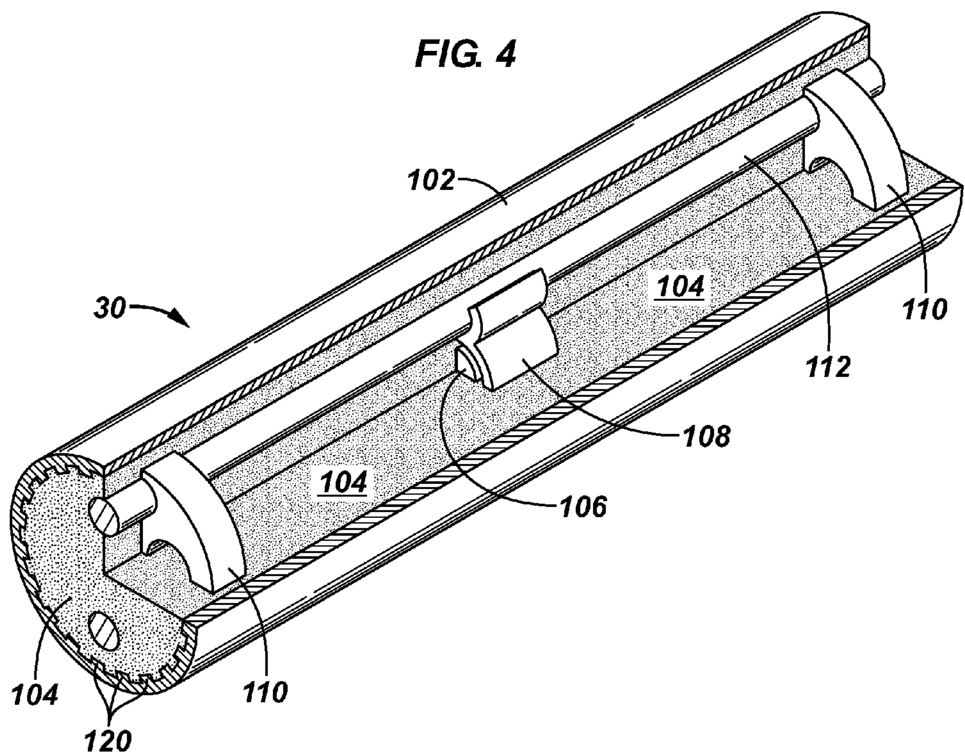
FIG. 4 is a partial broken-away, perspective view of a portion of a streamer according to another embodiment of the present disclosure.
Figure 5A:
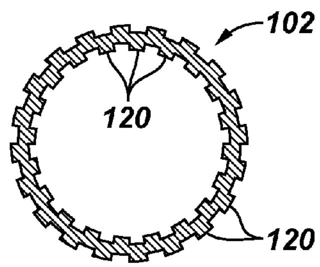
FIGS. 5A, 5B and 6 illustrate additional embodiments of a streamer skin according to the present disclosure.
Figure 5B:
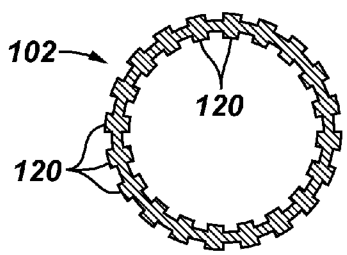
Figure 6:
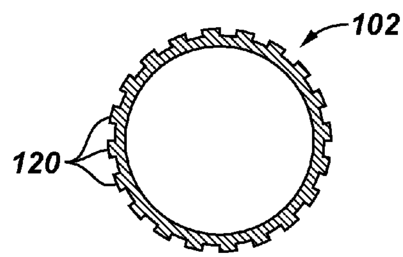

Referring to FIG. 4, in some embodiments, the skin 102 may be modified to include ribs 120 formed along the interior circumference (i.e. surface) thereof. When stretching a cable there is a cross coupling between stretching and contraction, which generates undesirable pressure waves (noise) picked up by the sensors. In embodiments where the streamer skin 102 has a high modulus of elasticity (e.g., above 60 MPa), these effects become more dominant compared to conventional streamers with softer skin. The ribs 120 depicted in FIG. 4 provide increased flexibility in the radial direction. Average radial stiffness is maintained as for soft skin; hence, any flexible stretching is picked up by the streamer 30 in the same manner as for soft skin. That is, the non-uniform thickness of the skin 102 imparted by the ribs 120 permits the skin to flex under pressure, thus damping the pressure waves produced. With reference to FIGS. 5A and 5B, additional embodiments are contemplated in which ribs 120 are formed on both the interior and exterior circumferences of the skin 102. FIG. 5A illustrates an alternating rib pattern, while FIG. 5B illustrates an aligned rib pattern. By forming ribs on the exterior circumference, drag and friction can be reduced during towing of the streamer through water. In some embodiments, the exterior ribs may be smaller and denser relative to the interior ribs. Also, the exterior ribs may be formed in a twisting, helical, wave, or other nonlinear pattern along the length of the streamer. FIG. 6 illustrates yet another embodiment in which ribs are formed only on the outer circumference of the skin 102. The ribs 120 of FIG. 6 may provide the same or similar benefit as the interior ribs.

While the present disclosure has been described with respect to a limited number of embodiments, those skilled in the art, having the benefit of this disclosure, will appreciate numerous modifications and variations therefrom. For example, it is contemplated that the sensor element may be housed in a material that has equal, less or greater shear stiffness than the surrounding filler gel 104. Also, it is to be appreciated that the streamer skin may be manufactured according to a number of processes, including dual layer extrusion and three layer extrusion processes. Such processes may involve polymers having different properties. The streamer skin 102 may also be formed to have a varying stiffness from an exterior circumference to an interior circumference of the skin. Indeed, in some embodiments, the skin 102 may have a higher modulus of elasticity along the exterior circumference relative to the interior circumference. It is intended that the appended claims cover all such modifications and variations as fall within the true spirit and scope of this present disclosure.

What is claimed is:

1. An apparatus, comprising:

a streamer having seismic data acquisition devices enclosed within a skin, the skin having a modulus of elasticity of at least 30 MPa;

the seismic data acquisition devices comprising a multi-component seismic sensor, the seismic data acquisition devices being supported within a filler material that is supported within and in contact with an inside surface of the skin, wherein the modulus of elasticity of the skin is selected according to the type of filler material to reduce turbulent noise within the streamer.

2. The apparatus of claim 1, wherein the skin has a modulus of elasticity of between 50-60 MPa.

3. The apparatus of claim 1, wherein the filler material is a gel-like material.

4. The apparatus of claim 1, wherein the seismic data acquisition devices include a hydrophone for measuring pressure and three orthogonally-aligned accelerometers to measure three corresponding orthogonal components of particle velocity and/or acceleration.

5. The apparatus of claim 4, wherein the multi-component sensors are housed within a liquid-filled pocket defined within the filler material.

6. The apparatus of claim 1, wherein the skin includes one or more longitudinally extending ribs defined thereon.

7. The apparatus of claim 6, wherein the ribs are defined along an interior surface of the skin.

8. The apparatus of claim 6, wherein the ribs are defined along an exterior surface of the skin.

9. The apparatus of claim 6, wherein the ribs are defined along an exterior and interior surface of the skin.

10. The apparatus of claim 9, wherein the ribs formed along the exterior surface are smaller relative to the ribs formed along the interior surface.

11. The apparatus of claim 9, wherein the ribs formed along the exterior surface are denser relative to the ribs formed along the interior surface.

12. A seismic spread, comprising:

a streamer for use in seismic data acquisition, the streamer comprising:

a skin having a modulus of elasticity of at least 30 MPa;

a gel filler material supported within the skin;

one or more seismic data acquisition devices enclosed with the gel filler material, the one or more seismic data acquisition devices comprising a multi-component seismic sensor, the modulus of elasticity of the skin being selected according to the type of gel filler material to reduce turbulent noise within the streamer; and a vessel for towing the streamer.

13. The seismic spread of claim 12, wherein the modulus of elasticity of the skin varies from an exterior surface of the skin to an interior surface of the skin.

14. The seismic spread of claim 13, wherein the modulus of elasticity of the skin varies from an exterior surface of the skin to an interior surface of the skin.

15. an apparatus, comprising:

a streamer having one or more seismic data acquisition devices enclosed within a skin, the skin having a modulus of elasticity of at least 30 MPa;

a filler material supported within the skin during use of the streamer; and the skin having longitudinally extending ribs on an inner surface of the skin, wherein the skin and the ribs of the skin are together an uninterrupted material in a radial direction, the ribs being arranged to facilitate flexing of the skin under pressure in a manner which also dampens pressure waves produced during stretching of the streamer.

16. The apparatus of claim 15, wherein the acquisition devices are multi-component seismic sensors.

17. The apparatus of claim 16, wherein the multi-component seismic sensors comprise three orthogonally-aligned accelerometers to measure three corresponding orthogonal components of particle velocity and/or acceleration near the seismic sensor.

* * * * *